US006862691B2

(12) United States Patent
Hayden

(10) Patent No.: US 6,862,691 B2
(45) Date of Patent: Mar. 1, 2005

(54) REDUNDANT COMPONENT SYSTEM AND METHOD FOR FACILITATING ENDSYSTEM FUNCTIONALITY

(75) Inventor: Douglas Todd Hayden, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 555 days.

(21) Appl. No.: 09/957,268

(22) Filed: Sep. 19, 2001

(65) Prior Publication Data

US 2003/0061530 A1 Mar. 27, 2003

(51) Int. Cl.⁷ .................... G08F 11/00; G05B 13/02
(52) U.S. Cl. .................... 714/6; 714/1; 714/47; 700/28; 700/79
(58) Field of Search .................... 714/1, 6, 47; 700/28, 700/79

(56) References Cited

U.S. PATENT DOCUMENTS 5,799,173 A * 8/1998 Gossler et al. .......... 703/21
6,085,333 A 7/2000 DeKoning et al. ........ 714/7
6,140,926 A 10/2000 Hayden et al. .......... 340/635
6,654,699 B2 * 11/2003 Millard .................. 702/108

FOREIGN PATENT DOCUMENTS

JP 08278850 A * 10/1996 ............ G06F/3/06

* cited by examiner

Primary Examiner—Robert Beausoliel
Assistant Examiner—Emerson Puente

(57) ABSTRACT

An arrangement includes a redundant component system and an endsystem linked with the redundant component system. The redundant component system includes a plurality of components such that the total number of components of this plurality is based on a redundant component quantity. To determine the redundant component quantity, a code-based sequence is provided by the present invention. The code-based system may optionally provide an output that includes designs for redundant component systems, each design having a total number of components equal to the redundant component quantity. To operate the component system, a continuous endsystem functionality program sequence is also provided by the present invention. The continuous endsystem functionality program sequence correlates operational or "duty" cycles for each component comprising the redundant component system with fault tolerant characteristics so that at least one component provides functionality to the endsystem at any given time.

31 Claims, 8 Drawing Sheets

US 6,862,691 B2

REDUNDANT COMPONENT SYSTEM AND METHOD FOR FACILITATING ENDSYSTEM FUNCTIONALITY

FIELD OF THE INVENTION

This invention relates to redundant systems. More particularly, this invention relates to a redundant component system and method for selecting the optimal number of components comprising the redundant component system to provide continuous endsystem availability or "functionality", even during component failure or nonoperating.

BACKGROUND OF THE INVENTION

Today's increasing dependence on electronic and/or computer code based systems, such as computers, wireless devices, and internet appliances, requires that these systems operate continuously and reliably. Today's systems demand a greater level of "fault tolerance" so that these systems may continue to operate optimally even under adverse or "fault" conditions, such as when experiencing one or more errors, failures, or faults in a system's constituent components. Therefore, a system operating with fault tolerant characteristics refers to a system capable of continuous and optimal operation despite experiencing one or more errors, failures, or faults in a system's constituent components.

Redundancy is a concept commonly applied by the electronics and/or computer code-based systems industry for improving the fault tolerance of systems. Typically, in a redundant system, some or all of the components are duplicated, thereby providing at least one backup component in the event of a failure occurring in a primary component. The "failure" of a component refers to the component no longer providing at least one of its functions at an expected level of operation.

One example of a redundant system is a RAID (Redundant Array of Independent Disks) system, where multiple disks are used to store the same information, in whole or in part. Thus, during operation of a host system requiring information storage, if one of the disks of a RAID system fails, another disk can replace it.

Another example of a redundant system is a transmitter component system, especially for use with a transceiver. For a transceiver, multiple transmitters are used to send information from the transceiver to a desired location and/or component. Thus, during operation of a transceiver, which often sends large volumes of information, if one of the transmitters of a transmitter component system fails another transmitter can replace it.

One problem frequently encountered in redundant systems is determining the optimum number of components for ensuring the continuous, fault tolerant operation of an endsystem. As a matter of saving cost, labor, and time associated with manufacturing redundant component systems, there is a need in the art for a redundant component system and method for determining a threshold value that reflects the minimum number of components required for forming that redundant component system.

SUMMARY OF THE INVENTION

Accordingly, an arrangement includes a redundant component system and an endsystem linked with the redundant component system. In operation, the redundant component system provides functionality to the endsystem with fault tolerant characteristics. The redundant component system includes a plurality of components such that the total number of components of this plurality is based on a redundant component quantity.

Moreover, to determine the redundant component quantity, a code-based sequence is provided. In operation, the code-based sequence receives component system data. Based on the component system data, a resulting operational component quantity and a recovery component quantity is then produced by the code-based sequence. From the operational component and the recovery component quantities, the code-based sequence determines a resulting redundant component quantity.

Although those of ordinary skill in the art will recognize other fields and embodiments for selecting the optimal number of components required for forming a redundant component system, this disclosure and appended claims provide three preferred embodiments. The first embodiment, in a general form of the present invention, includes a redundant component system for providing functionality to an endsystem. The second embodiment, in a form drawn to RAID systems, includes a redundant disk component system for providing functionality to a controller module. The third embodiment, in a form drawn to transmitter systems, includes a redundant transmitter component system for providing functionality to a transceiver.

DETAILED DESCRIPTION OF THE INVENTION

Figure 1:
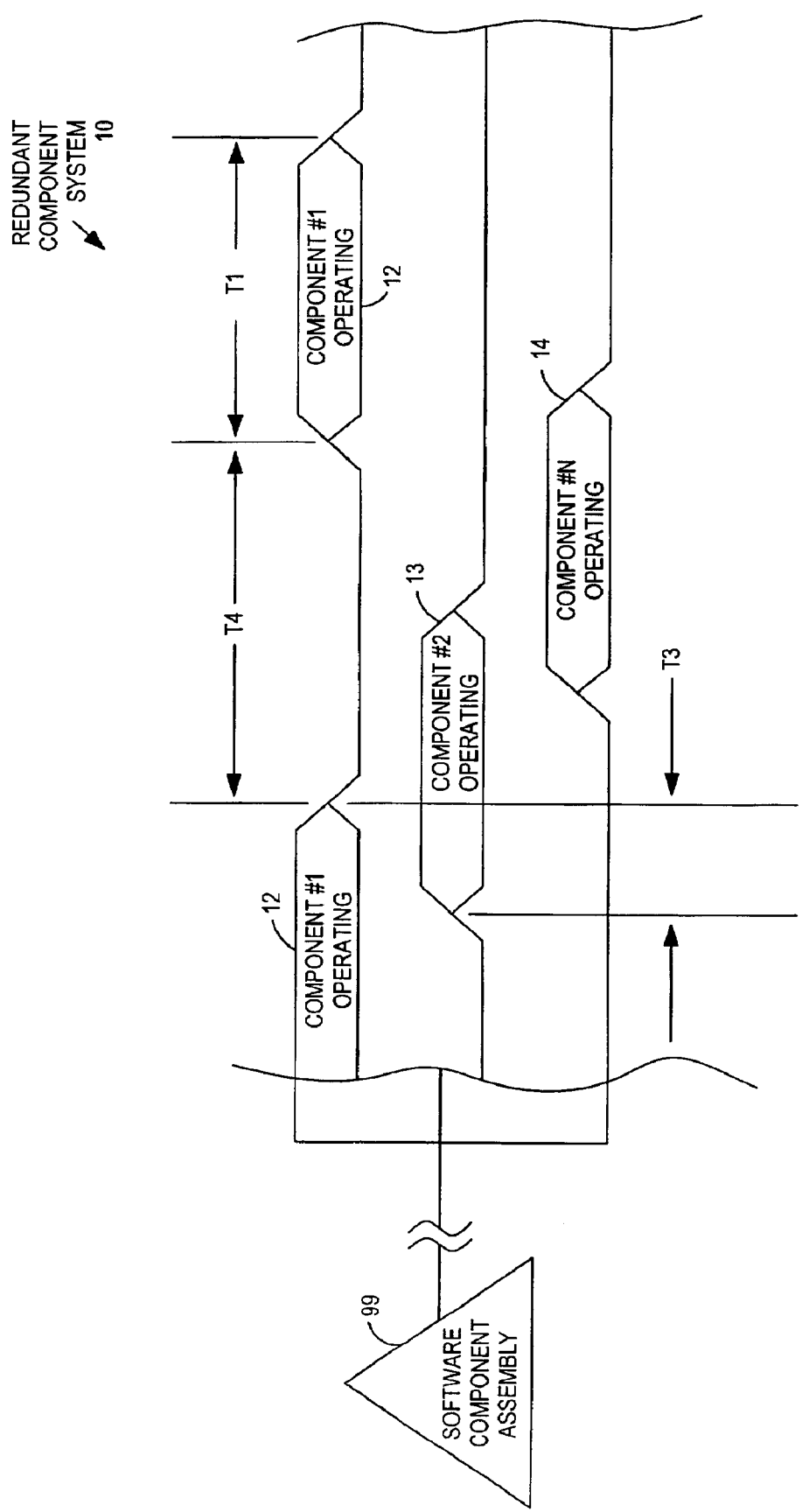
FIG. 1 is a schematic diagram of one preferred embodiment of a redundant component system of the present invention illustrating respective duty cycles for each component, 1-n, comprising the redundant component system.
Figure 2:
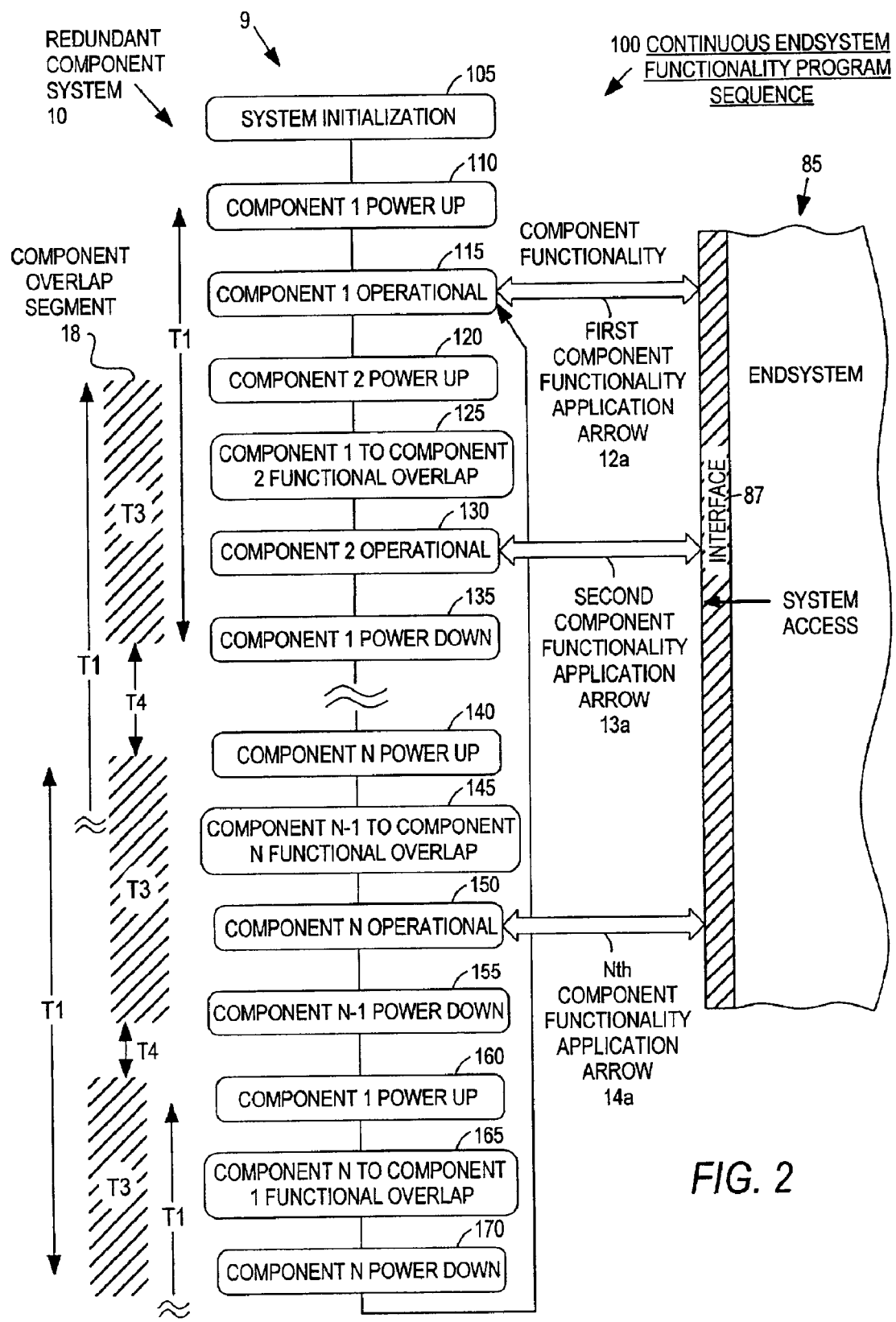
FIG. 2 is a schematic diagram of the redundant component system of FIG. 1 applying functionality to an endsystem via a continuous endsystem functionality program sequence for correlating duty cycles for each component, 1-n, so that at least one component provides functionality to the endsystem at any given time.

The preferred embodiments of the present invention are illustrated by way of example in FIGS. 1–9. As is preferred, FIG. 1 shows one embodiment of the redundant component system 10. FIG. 2 shows an arrangement 9 including a redundant component system 10 and an endsystem 85. The redundant component system 10 includes a plurality of components. Specifically referring to the embodiment of FIG. 1, the redundant component system 10 includes a first component 12, a second component 13, and a nth component 14.

In this disclosure and appended claims, the nth component 14 is a numerical variable referring to the last component of a total number of components comprising the redundant component system 10. Moreover, in the preferred embodiment, each redundant component system is configured so that the "nth numerical value" of the nth component comprises a derived redundant component quantity. The redundant component quantity is a threshold value reflecting the minimum number of components required for providing functionality to an endsystem with fault tolerant characteristics.

Figure 6:
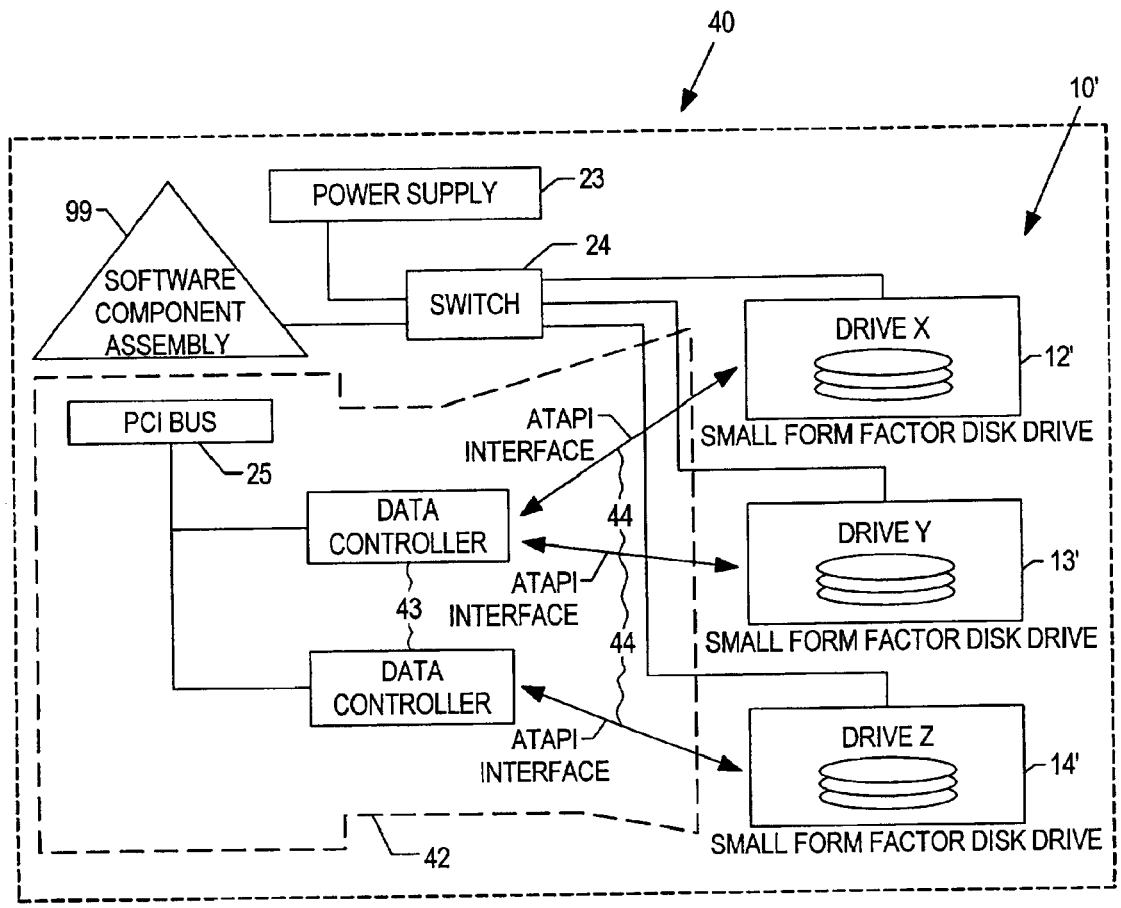
FIG. 6 is a schematic diagram of the controller module of FIG. 5, the controller module providing a detailed illustration of the redundant component system including disk drives, x-z.

For example, the derived redundant component quantity for a redundant disk component system 10' of FIG. 6 is the numerical value of three such that the redundant disk component system 10' comprises three disk components 12'–14' or, as commonly referred to in the industry as "disk drives". In particular, the redundant disk component system 10' of FIG. 6 includes a first disk component 12', a second disk component 13' and, based on the redundant component quantity, a third disk component 14'.

It must be said that in this disclosure and the appended claims, the terms "availability" or "functionality" refer to a redundant component system's ability to operate, without error or failure, so that an endsystem may invariably access the component system to perform a respective duty with fault tolerant characteristics. Illustratively, consider a redundant component system comprising a plurality of disk drives and an endsystem comprising a "RAID" controller module. In operation, the plurality of disk drives provide functionality to the RAID controller as a whole. Thus, the RAID controller processes data for memory storage with fault tolerant characteristics, even if at least one of the disk drives from the plurality of disk drives is subject to error or failure.

FIG. 2 illustrates the redundant component system 10 applying functionality to an endsystem 85 via a continuous endsystem functionality program sequence 100. The continuous endsystem functionality program sequence 100 is a software component for use by any device which operates with computer-based code, such as a computer, a wireless device, or an internet appliance for example. As shown in FIG. 1, the component system 10 further includes a software component assembly 99 linked with each component that defines the plurality of components 12–14. The software component assembly 99 stores and executes software components associated with the redundant component system 10, such as the continuous endsystem functionality program sequence 100. Preferably, the software component assembly 99 includes a memory device for storing software components and a processor for executing software components for operational application thereof.

Figure 5:
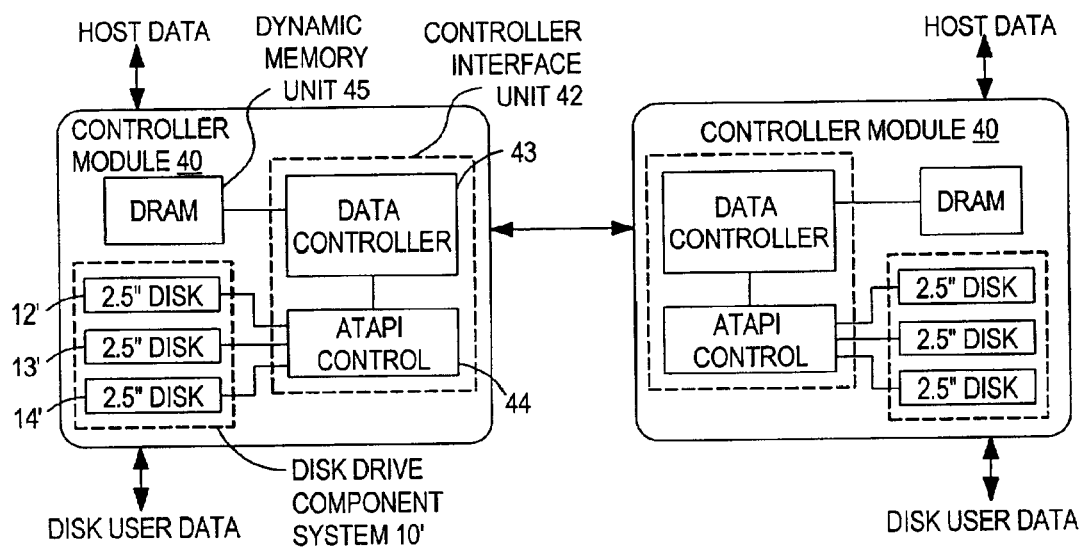
FIG. 5 is a schematic diagram one preferred embodiment of a redundant disk component system of the present invention as applied to RAID disk drives for use with an endsystem that is a controller module.

It should also be said that an endsystem is defined as a system that requests an operation and/or application from a component system whereas a component system refers to a system that provides an operation and/or application to the endsystem. As an example, this disclosure features three illustrative embodiments for an endsystem, including an endsystem 85 for one general embodiment of FIGS. 1–3, a RAID controller module 40 embodiment of FIGS. 5–7, and a transceiver 41 embodiment of FIGS. 8–9. Moreover, this disclosure features three preferred embodiments for a redundant component system, including a redundant component system 10 for one general embodiment of FIGS. 1–3, a redundant disk component system 10' embodiment of FIGS. 5–7, and a redundant transmitter component system 10" embodiment of FIGS. 8–9. Component system 10 may be, for example, a plurality of disk components 12'–14' as shown in FIG. 5 or a plurality of transmitter components 12"–14" as shown in FIG. 8.

In operation, the redundant component system 10 of FIG. 2 is initialized in step 105. The initialization process of step 105 includes starting the continuous endsystem functionality program sequence 100. In the preferred embodiment, the continuous endsystem functionality program sequence 100 is a code-based program sequence for execution by a processor (not shown) included with the software component assembly 99. Thus, the continuous endsystem functionality program sequence 100 operates the component system 10 linked to the processor. It should also be said that the continuous endsystem functionality program sequence 100 operates the component system 10 as a function of time.

During the initialization process of step 105, the processor provides component system data for the continuous endsystem functionality program sequence 100. In general, for the embodiment of FIGS. 1–3, component system data are predetermined values for use by the continuous endsystem functionality program sequence 100 of FIG. 2 as well as a code based sequence 500 of FIG. 3. The component system data includes a component time specification value indicated in FIG. 2 as "T1". The component time specification value refers to the allowable operational period of each component 12–14 of the redundant component system 10. The component system data includes a system required operational time value indicated in FIG. 2 as "T2". The system operation time value "T2" refers to the required operational period for the endsystem 85.

The component system data includes a component overlap time value indicated in FIG. 2 as "T3". The component overlap time value "T3" refers to a period where one component is ending operation while a succeeding component is beginning operation such that the one component and the succeeding component are both operational during this period. Illustratively, the component overlap time value is portrayed in FIG. 2 as a time segment 18. The component system data further includes a component recovery time value indicated in FIG. 2 as "T4". The component recovery time value "T4" refers to a period of nonoperation of each component 12–14 of the redundant component system 10 required to ensure reliable operation of that component.

Referring to the continuous endsystem functionality program sequence 100 of FIG. 2, the first component 12 in step 110 is activated in preparation for operation thereof. In step 115, as indicated in FIG. 2 by a first component functionality application arrow 12a, the first component 12 provides functionality to the endsystem 85. It should also be said the endsystem 85 includes an interface 87. The interface 87 tranceives an application and/or operation from each component 12–14 for use by the endsystem 85.

In step 120, the second component 13 is activated in preparation for operation. Based on the component overlap time value, T3, the first component 12 in step 125 is ending operation while the succeeding second component 13 is beginning operation such that the first component 12 and the succeeding second component 13 are both capable of operation during this period. Some time period may be required during T3 to prepare component 13 for operation based on the state of component 12. At some point in time, active functionality is transferred from component 12 to component 13. Therefore, the second component 13 provides functionality to the endsystem 85 in step 130 and the first component 12 is deactivated in preparation for nonoperation in step 135. As indicated in FIG. 2 by a second component functionality application arrow 13a, the second component 13 in step 130 provides functionality to the endsystem 85.

Similar to the initial operational correlation between the first component 12 and the second component 13 in steps 110 through 135, the continuous endsystem functionality program sequence 100 continues with steps 130 through 170. For steps 130 through 170, those of ordinary skill in the art will recognize other time durations for the endsystem 85 so as to complete the operational time of the endsystem 85. Preferably, beginning with step 110, the duration of the continuous endsystem functionality program sequence 100 is dictated by the system operational time value, T2 for FIGS. 1–2.

Illustratively, for the component system 10 of FIG. 1 having a first component 12, a second component 13, and a third or "nth" component 14, the continuous endsystem functionality program sequence 100 of FIG. 2 ends by deactivating the nth component 14 with respect to the second component 13. However, so long as the duration of endsystem operation is dependent on the system operational time value, T2, those of ordinary skill in the art will readily recognize deactivating the continuous endsystem functionality program sequence 100 at any component (12, 13, and/or 14).

Referring now to FIG. 2 step 140, the nth component 14 is activated in preparation for operation thereof. Based on the component overlap time value, T3, the second component, generically "n-1," 13 in step 145 is ending operation while the succeeding nth component 14 is beginning operation such that the second component 13 and the succeeding nth component 14 are both capable of operation during this period. Some time period may be required during T3 to prepare component 13 for operation based on the state of component 12. At some point in time, active functionality is transferred from component 12 to component 13. In step 150, as indicated in FIG. 2 by a nth device functionality application arrow 14a, the nth component 14 provides functionality to the endsystem 85. The second component 13 in step 155 is deactivated in preparation for nonoperation. In step 160, the first component 12 is activated in preparation for operation, starting another cycle of redundant component operation.

Preferably, the continuous endsystem functionality program sequence 100 ends by deactivating the nth component. Thus, based on the component overlap time value, T3, the nth component 14 in step 165 is ending operation while the succeeding first component 13 is beginning operation such that the nth component 14 and the succeeding first component 12 are both operational during this period. The continuous endsystem functionality program sequence 100 ends in step 170 by deactivating the nth component 14 in preparation for nonoperation.

It must be said that the redundant component system 10 is configured for providing optimal functionality to the endsystem 85 based on a redundant component quantity. The redundant component quantity is a threshold value reflecting the minimum number of components required for configuring each redundant component system so as to provide reliable functionality to a corresponding endsystem.

Figure 3:
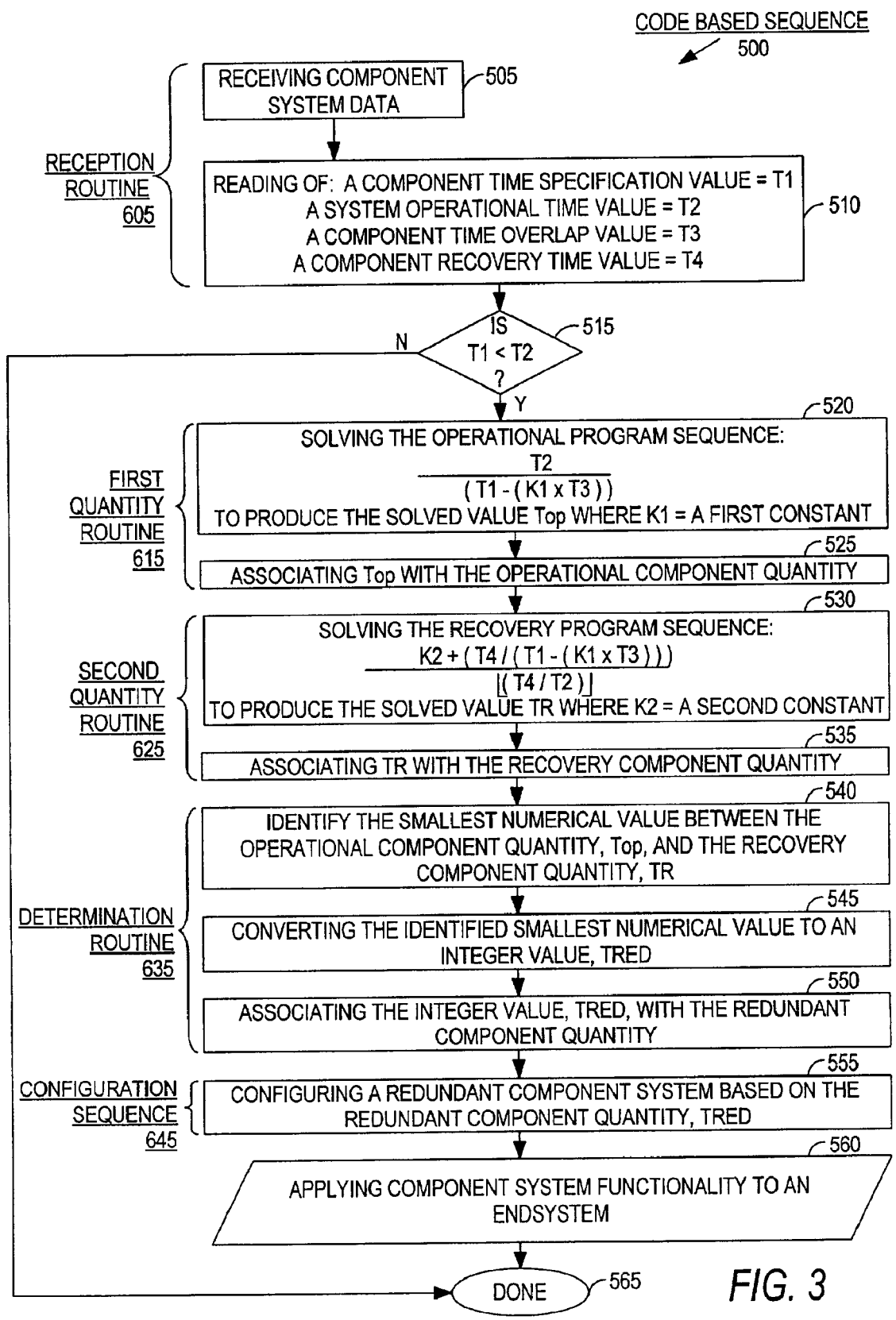
FIG. 3 is a flow diagram illustrating a code based sequence for deriving a redundant component quantity, the redundant component quantity is a threshold value reflecting the minimum number of components required for configuring a component system so as to provide functionality to an endsystem with fault tolerant characteristics.

FIG. 3 provides a code-based sequence 500 for deriving a redundant component quantity. In a preferred embodiment, the code-based sequence 500 is a software component for use by any device which operates with computer-based code, such as a computer, a wireless device, or an internet appliance for example. Like the continuous endsystem functionality program sequence 100 of FIG. 2, the code-based sequence 500 is provided by the software component assembly 99.

With specific reference FIG. 3, the computer-based sequence 500 is subdivided into a variety of routines. In sum, the computer-based sequence 500 includes a reception routine 605, a first quantity routine 615, a second quantity routine 625, a determination routine 635, and a configuration sequence 645.

The reception routine 605 includes steps 505 and 510 of FIG. 3. In step 505, the software component receives the component system data. In step 510, the component system data is read, including values for T1, T2, T3, and T4. The component system data also includes a first constant, K1, and a second constant, K2. In one preferred embodiment, for purposes of illustration, the first constant, K1, is equal to the value of the whole number two whereas the second constant, K2, is equal to the value of the whole number one.

In step 515, the software component determines whether the component time specification value, T1, is less than the system operational time value, T2. If the component time specification value, T1, is greater than or equal to the system operational time value, T2, the number of components, Tred, required for providing reliable functionality to the endsystem 85 is one component. Accordingly, because a redundant component quantity is not needed, the software component advances from step 515 to step 565 to complete execution of the code-base sequence 500.

For a component operational time specification value less than the operational time value, the code-based sequence 500 advances from step 515 to 520. The first quantity routine 615 includes steps 520 and 525 of FIG. 3. In step 520, to produce the solved value "T-op", the software component solves the following program sequence with the component system data:

$$\frac{T2}{(T1-(K1\times T3))}.$$

Thus, in step 525, the software component associates the solved value, "T-op", with the operational component quantity. The operational component quantity is a raw number based solely on the component operational time specification value, T1, and the system operational time value, T2. The operational component quantity refers the unique number of components. This unique number of components is a first pass calculation which assumes that no component may be "re-used" by satisfying its recovery time specification.

The second quantity routine 625 includes steps 530 and 535 of FIG. 3. In step 530, to produce the solved value Tr, the software component solves the following program sequence with the component system data:

$$\frac{K2 + (T4/(T1 - (K1 \times T3)))}{\lfloor (T4/T2) \rfloor}.$$

Therefore, in step 535, the software component associates the solved value, Tr, with the recovery component quantity. The recovery component quantity refers to the derived number of components, Tr, required for operating the endsystem 85 according to the system operational time value, T2. The recovery component quantity is derived by accounting for recovery time constraints required for reliable operation by each component.

A determination routine 635 includes steps 540 through step 550. By comparing the recovery component quantity, Tr, with the operational component quantity, "T-op", the software component in step 540 identifies the smallest numerical value between Tr and "T-op". In step 545, because Tr and "T-op" are derived ratios, the software component converts the smallest identified numerical value from step 540 to an integer value, "Tred". For example, for the minimum value between "4.61" and "4.85" identified in step 540, the software component in step 545 converts the minimum value "4.61" to the integer 5. Preferably and according to well known mathematical convention, the software component coverts by rounding each identified decimal value to the next highest integer value by a "ceiling function ".

Referring to step 550 of FIG. 3, the software component associates the integer value, Tred, with the redundant component quantity. Given the derived redundant component quantity, the code-based sequence 500 of executes a configuration sequence 645. The configuration sequence 645 includes step 555 for configuring a redundant component system based on the redundant component quantity. Accordingly, the software component in step 555 generates a design for a component system having a total number of redundant components equal to Tred. In step 560, the software component provides output including a design of the component system of step 555 so that hardware may be configured to form the component system according to that design before ultimately ending the code-based sequence 500 in step 565.

Referring to FIGS. 4–7, another preferred embodiment of the present invention applies the code-based sequence 500 and the continuous endsystem functionality program sequence 100 to RAID controller endsystems. Thus, in this embodiment the code-based sequence 500 derives a redundant component quantity for disk drives associated with RAID controller endsystems. With the redundant component quantity, the code-based sequence 500 generates a redundant disk component system design for constructing the redundant disk component system 10'. Preferably, designs may include using small form factor disks as disk components 12'–14'.

Figure 8:
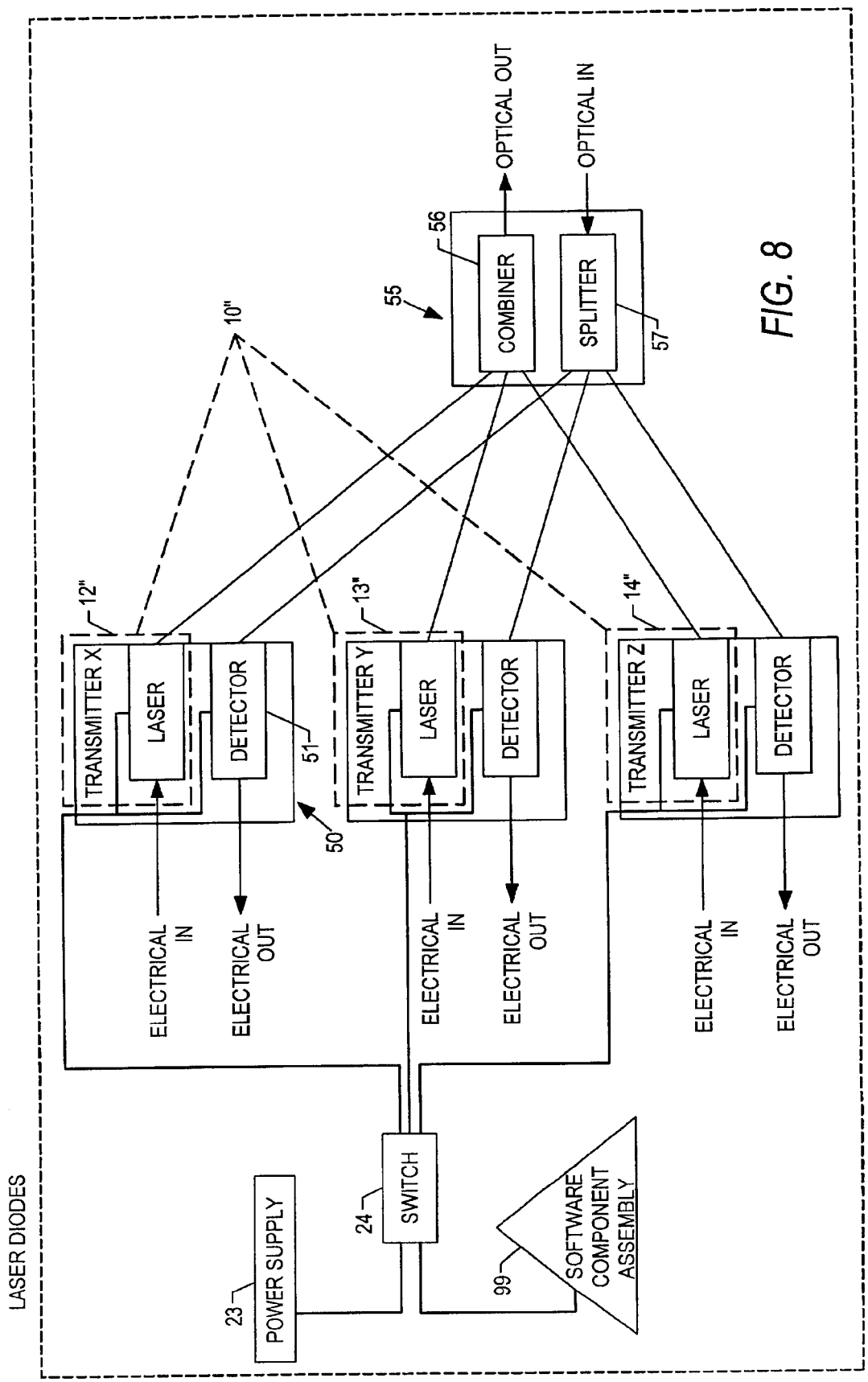
FIG. 8 is a schematic diagram of a laser diode associated with a transceiver, the laser diode illustrating a redundant transmitter component system including transmitters, x-z.
Figure 9:
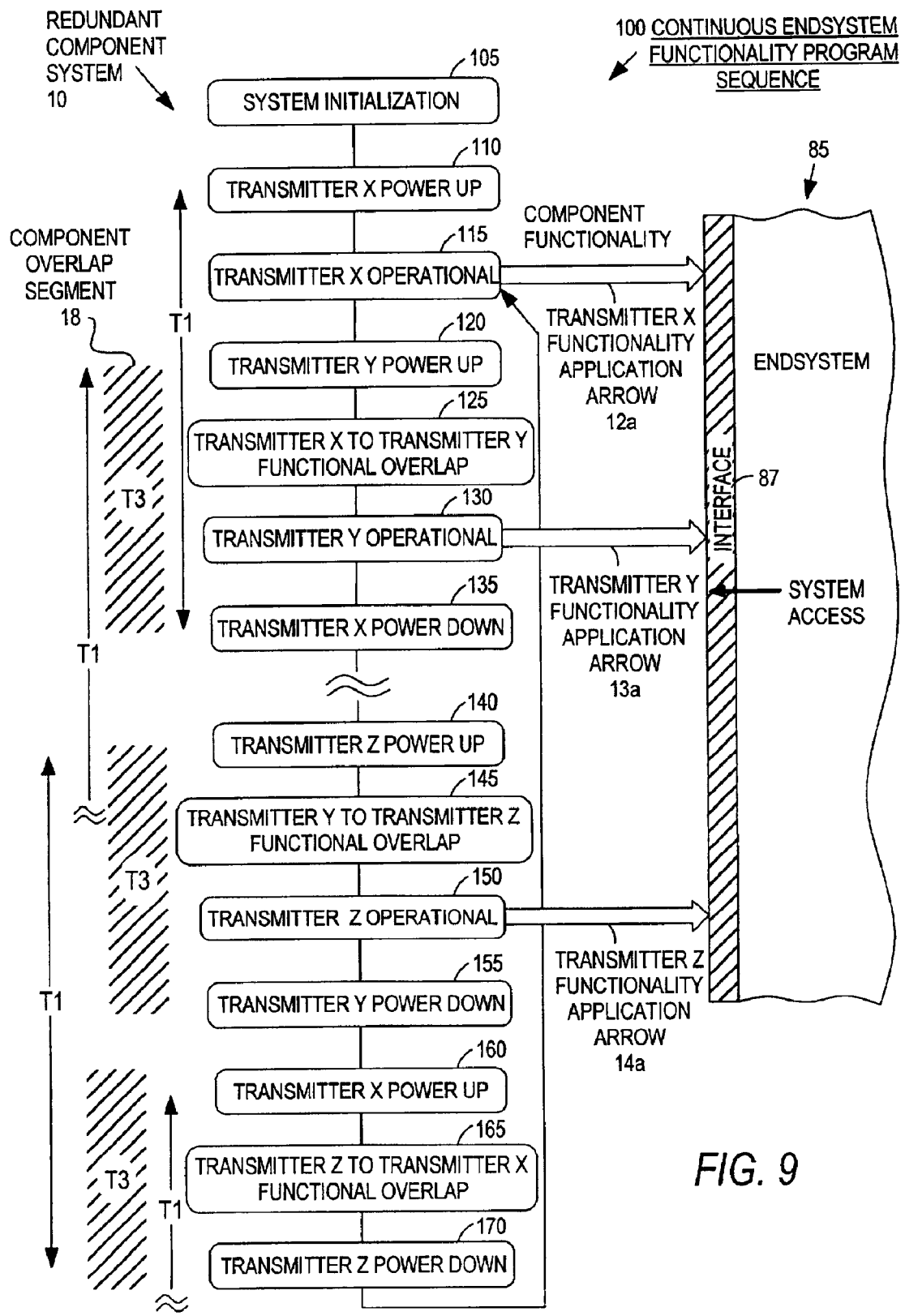
FIG. 9 is a schematic diagram of the redundant transmitter component system of FIG. 8 applying functionality to an endsystem that is the transceiver via a continuous endsystem functionality program sequence for correlating duty cycles for each transmitter, x-z, so that at least one transmitter provides functionality to the transceiver at any given time.

Alternatively, with reference to FIGS. 8–9, yet another preferred embodiment of the present invention applies the code-based sequence 500 and the continuous endsystem functionality program sequence 100 to transceiver endsystems. Thus, in this embodiment, the code-based sequence 500 derives a redundant component quantity for transmitters associated with transceiver endsystems. With the redundant component quantity, the code-based sequence 500 generates a component system design for constructing a redundant transmitter component system 10", especially, for example, designs including laser diode transmitters as transmitter components 12"–14". It should be added, however, that those of ordinary skill in the art will readily recognize that the code-based sequence 500 and the continuous endsystem functionality program 100 may be applied to design and operation of any redundant component system for use with endsystems, including endsystems requiring computer-based code. For example, the code-based sequence 500 and the continuous endsystem functionality program 100 may be applied to a redundant component system comprising a plurality of fans for providing functionality to heated components within a computer chassis.

Figure 4:
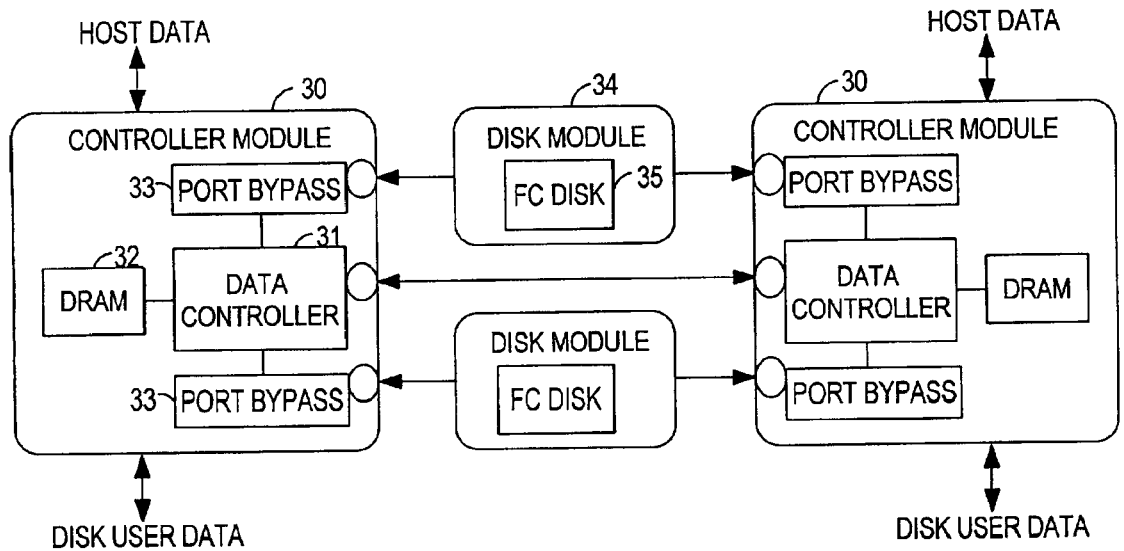
FIG. 4 is a schematic diagram illustrating a prior art redundant disk component system as applied to RAID disk drives for use with a controller module end system.

With specific reference to the embodiment associated with RAID controller endsystems, FIG. 4 shows a prior art redundant disk component system as applied to RAID disk drives for data storage by a computer-based host system (not shown). FIG. 4 shows a pair of RAID controller module endsystems. Each RAID controller module endsystem 30 stores and protects data for use by the computer-based host system or for storage by a storage device (not shown). As is commonly used in the industry, each RAID controller module endsystem 30 facilitates data storage to safeguard against catastrophic failure.

Further, each RAID controller module endsystem 30 includes a data controller 31 for data storage between the computer-based host system, the storage device as well as another RAID controller module endsystem 30. In operation, data generated and used for synchronization of user data is sent to a dynamic memory unit 32 as well as a plurality of disk modules 34.

The dynamic memory unit 32 provides short term or "dynamic" memory storage. On the other hand, each disk module 34 facilitates storage of journal or, commonly, "intermediate" data via a storage disk 35 provided by the disk module 34. The plurality of disk modules 34 define a redundant component system to ensure that journal data is stored and retrieved by the prior art computer-based host system with fault tolerant characteristics. In operation, intermediate data is sent from the data controller 31 through a respective port bypass device 33 to the disk modules 34 operating on a Fibre Channel loop.

Referring to the present invention, FIG. 5 generally shows a redundant disk component system 10' as applied to RAID disk drives for use with an endsystem that is the controller module 40. Similar to FIG. 4, FIG. 5 shows a pair endsystems, each comprising a controller module 40. Each controller module 40 stores and protects data for use by a host system (not shown), such as a computer, or for storage by a storage device (not shown), such as a JBOD storage device.

In FIG. 5, however, each controller module 40 includes a controller interface unit 42. The controller interface unit 42 includes a data controller 43 for data synchronization. Preferably, the data controller 43 stores and protects data between the host system, the storage device, as well as another controller module 40. In operation, data is sent by the data controller 43 to a dynamic memory unit 45 as well as to the redundant disk component system 10'. The dynamic memory unit 45 provides dynamic memory storage whereas the redundant disk component system 10' stores journal or, commonly, "intermediate" data.

Referring to FIGS. 5 and 6, the redundant disk component system 10' includes a plurality of disk components 12'–14'. By cooperatively operating with one another, the plurality of disk components 12'–14' as a whole define the redundant component system 10' for the controller module 40. In effect, each disk component 12'–14' facilitates storage of intermediate data. Therefore, in operation, intermediate data is sent from the data controller 43 through a respective disk component interface 44 to the disk components 12'–14'.

Preferably, the controller module 40 comprises an ATAPI controller, such as for example the TITAN series of RAID controllers produced by CMD Technology, Inc. of Irvine, Calif. Further, each disk component interface 44 comprises an ATAPI interface, such as for example the ATAPI interface integrated with each of CMD Technology's TITAN series ATAPI controllers. Additionally, in the preferred embodiment, each disk component 12'–14' comprises a small form factor disk drive that are standard in the industry, such as small form factor disk drives commonly used by laptop computers, such as IBM DARA-206000 2.5 inch, 6GB, ATA-interface hard disk. Laptop computer small form factor disk drives provide a high volume, low cost means for manufacturing a redundant disk component system 10'.

For one preferred embodiment, as illustratively shown in FIGS. 5 and 6, the first disk component 12' includes drive X, the second disk component 13' includes drive Y, and the third disk component 14' includes drive Z. Each of drives X-Z are small form factor disk drives. Those of ordinary skill in the art will recognize that the redundant disk component system 10' for the controller module 40 may include any number of disk components so long as there are at least two disk components that comprise the redundant disk component system 10'

As compared with FIG. 5, FIG. 6 provides a schematic diagram of the disk component system 10' for the controller module 40 in greater detail. Specifically, as shown in FIG. 6, the first disk component 12', the second disk component 13', and the third disk component 14' are each powered by a power supply 23. The controller module 40 includes a switch 24, linked between the power supply 23 and the first disk component 12', the second disk component 13', and the third disk component 14'. The switch 24 selectively engages each disk component 12'–14' with respect to the continuous endsystem functionality program sequence 100.

Similar to the redundant component system 10 of FIG. 1, the redundant disk component system 10' of FIG. 6 further includes the software component assembly 99. The software component assembly 99 stores and executes software components associated with the redundant disk component system 10' including the continuous endsystem functionality program sequence 100 and the code-based sequence 500, as both applied to the redundant disk component system 10'. As shown in FIG. 6, in accordance with these software components, the software component assembly 99 is linked with the switch 24 and, ultimately, linked with the first disk component 12', the second disk component 13', and the third disk component 14' for selective engagement. Preferably, the software component assembly 99 includes a memory device for storing software components and a processor for executing software components for operation thereof.

Furthermore, FIG. 6 shows a detailed configuration of the controller interface unit 42 as is preferred. Specifically, the data controllers 43 are linked to one another via a bus assembly 25, preferably a PCI bus. As illustrated in FIG. 6, the ATAPI disk controller interface 44 is provided between each bused data controller 43 and a respective disk component 12'–14'.

Figure 7:
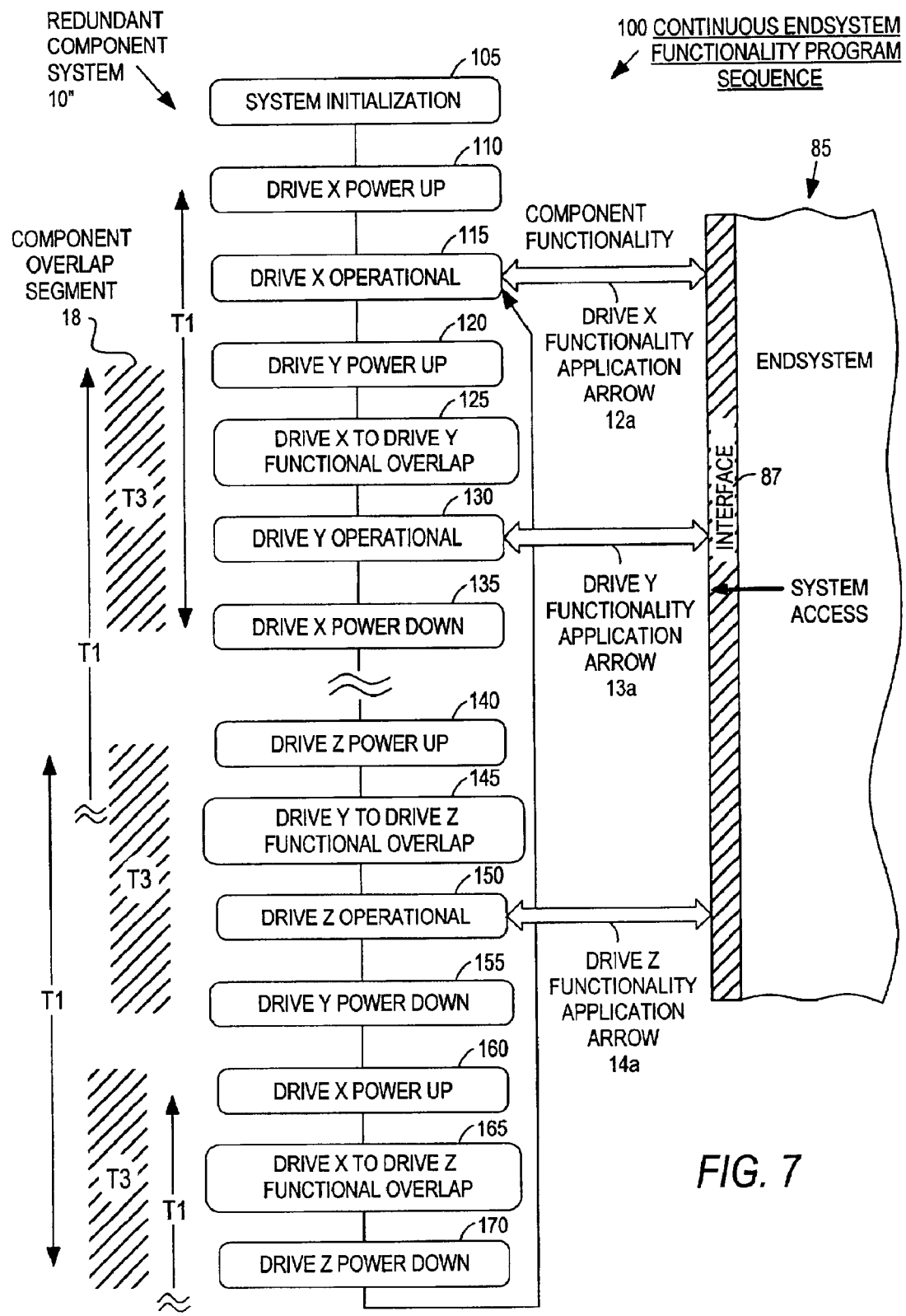
FIG. 7 is a schematic diagram of the redundant disk component system of FIG. 6 applying functionality to the controller module via a continuous endsystem functionality program sequence for correlating duty cycles for each disk drive, x-z, so that at least one disk drive provides functionality to the controller module at any given time.

FIG. 7 illustrates the redundant disk component system 10' in operation providing functionality to the controller module 40. In effect, the continuous endsystem functionality program sequence 100 of FIG. 7 as applied to a redundant disk component system 10' is identical to the continuous endsystem functionality program sequence of FIG. 2 as applied to a redundant component system 10. It should be further said that the continuous endsystem functionality program sequence 100 is, in a preferred embodiment, a software component for use by any device which operates with computer-based code, such as a computer, a wireless device, or an internet appliance for example. Preferably, the software component assembly 99 includes the continuous endsystem functionality program sequence 100 of FIG. 7.

Accordingly, referring to the continuous endsystem functionality program sequence 100 of FIG. 7, the drive X in step 110 is activated in preparation for operation thereof. In step 115, as indicated in FIG. 7 by a drive X functionality application arrow 12b, the drive X provides functionality to the controller module 40.

In step 120, the drive Y is activated in preparation for operation. Based on the component overlap time value, T3, the drive X in step 125 is ending operation while the succeeding drive Y is beginning operation such that the drive X and the succeeding drive Y are both operational during this period. Current data storage may be copied from drive X to drive Y during this time. Therefore, the drive Y provides functionality to the controller module 40 in step 130 and the drive X is deactivated in preparation for nonoperation in step 135. As indicated in FIG. 7 by a drive Y functionality application arrow 13b, the drive Y in step 130 provides functionality to the controller module 40.

Similar to the initial operational correlation between the drive X and the drive Y in steps 110 through 135, the continuous endsystem functionality program sequence 100 of FIG. 7 continues with steps 130 through 170. For steps 130 through 170, those of ordinary skill in the art will recognize other time durations for the controller module 40 so as to complete the operational time of the controller module 40. Preferably, beginning with step 110, the duration of the continuous endsystem functionality program sequence 100 is dictated by the system operational time value, T2 for FIGS. 5–7.

Illustratively, the continuous endsystem functionality program sequence 100 of FIG. 7 is based on the redundant disk component system 10' of FIG. 6 having three components, drives X, Y, and Z. Therefore, the continuous endsystem functionality program sequence 100 of FIG. 7 ends the loop and completes the cycle by deactivating the drive Z with respect to the drive Y However, so long as the duration of endsystem operation is dependent on the system operational time value, T2, those of ordinary skill in the art will readily recognize deactivating the continuous endsystem functionality program sequence 100 at any number of components 12'–14'.

Referring now to step 140, the drive Z is activated in preparation for operation thereof. Based on the component overlap time value, T3, the drive Y in step 145 is ending operation while the succeeding drive Z is beginning operation such that the drive Y and the succeeding drive Z are both operational during this period. Current data may be copied from drive Y to drive Z during this time. Current data may be copied from drive Y to drive Z during this time. In step 150, as indicated in FIG. 7 by a drive Z functionality application arrow 14b, the drive Z provides functionality to the controller module 40 The drive Y in step 155 is deactivated in preparation for nonoperation. In step 160, the drive X is activated in preparation for operation.

Preferably, the continuous endsystem functionality program sequence 100 ends by deactivating the drive Z. Thus, based on the component overlap time value, T3, the drive Z in step 165 is ending operation while the succeeding drive X is beginning operation such that the drive Z and the succeeding drive X are both operational during this period.

Current data may be copied from drive Z to drive X during this time. The continuous endsystem functionality program sequence 100 of FIG. 7 ends in step 170 by deactivating the drive Z in preparation for nonoperation.

It must be said that the redundant disk component system 10' is configured, in a preferred embodiment, for providing optimal functionality to the controller module 40 based on a redundant component quantity, Tred. For purposes of illustration, the redundant component quantity for the embodiment of FIGS. 5 through 7 is the numeral three, although those of ordinary skill in the art will readily recognize other values for Tred as dependent from component system data. Generally, the redundant component quantity for the redundant disk component system 10' is provided by the code-based sequence 500 of FIG. 3 as is preferred. The redundant component quantity is a threshold value reflecting the minimum number of components required for configuring the redundant disk component system 10' so as to provide functionality to the controller module 40.

FIG. 3 provides a code-based sequence 500 for deriving a redundant component quantity. Like the continuous endsystem functionality program sequence 100 of FIG. 7, software component assembly 99 provides the code based sequence 500 as applied to redundant disk component systems.

For purposes of Illustration, consider the code-based sequence 500 as deriving the numeral three so as to configure the embodiment of FIGS. 5–7. Therefore, for example, the controller module 40 must operate for 6.0 hours for T2, as associated with the system operational time value. For T1, as associated with the component time reliability specification value, each disk component 12'–14' is limited to 1.5 hours of continuous operation. On the other hand, each disk component 12'–14' requires 5.0 hours to recover between operation for T4, as associated with the component recovery time value. The time required for interchanging between each successive disk component 12'–14' is 0.1 hours for T3, as associated with the component overlap time value. Moreover, in this example, the first constant, K1, is equal to the numeral two and the second constant, K2, is equal to the numeral one.

Referring to FIG. 3 with respect to the redundant disk component system 10', the code-based sequence 500 begins with the reception routine 605. In step 510, the component system data is read. In step 515, the software component for the code-based sequence 500 determines that T1, as associated with the component time specification value, is less than T2, as associated with the system operational time value. For a component time specification value less than the system operational time value, the code-based sequence 500 advances from steps 515 to 520.

For the first quantity routine 615, the software component in step 520 solves the following program sequence with the component system data to produce the solved value, To:

$$\frac{T2}{(T1-(K1\times T3))} = \frac{6.0}{(1.5-(2.0\times 0.1))} = 4.61.$$

Thus, in step 525, the software component associates the solved value, To=4.61, with the operational component quantity. The operational component quantity is therefore 4.61.

For the second quantity routine 625, the software component in step 530 solves the following program sequence with the component system data to produce the solved value, Tr:

$$\frac{K2+(T4/(T1-(K1\times T3)))}{\lfloor(T4/T2)\rfloor} = \frac{1.0+(2.0/(1.5-(2.0\times 0.1)))}{\lfloor(2.0/6.0)\rfloor} = 2.53.$$

Therefore, in step 535, the software component associates the solved value, Tr=2.53, with the recovery component quantity. The recovery component quantity is therefore 2.53.

For the determination routine 635, the software component in step 540 compares the recovery component quantity, 2.53, with the operational component quantity, 4.61. Additionally, in step 540, the software component identifies the numeral 2.53 as the smallest numerical value between Tr and "T-op". In step 545, because Tr and "T-op" are derived ratios, the software component converts the smallest identified numerical value, 2.53, to an integer value of 3.

Referring to step 550 of FIG. 3, the software component associates the integer value with the redundant component quantity. The redundant component quantity is therefore the integer value of 3. Given the derived redundant component quantity, the code-based sequence 500 executes a configuration sequence 645. The configuration sequence 645 includes step 555 for configuring a redundant component system based on the redundant component quantity. Accordingly, the software component for the code-based sequence 500 in step 555 generates a design for a redundant disk component system having a total number of components equal to three disk components. In step 560, the software component for the code based sequence 500 provides output including a design of the component system of step 555 so that hardware associated with each disk component may be configured to form the redundant disk component system 10' of FIG. 6 for that design before ultimately ending the code-based sequence 500 in step 565.

With reference to FIGS. 8–9, another preferred embodiment of the present invention applies the code-based sequence 500 and the continuous endsystem functionality program sequence 100 to transceiver endsystems. Thus, the code-based sequence 500 derives a redundant component quantity for transmitters associated with transceiver endsystems. With the redundant component quantity, the code-based sequence 500 generates a component system design for constructing a redundant transmitter component system 10". Preferably, the designs may include using laser diode transmitters as redundant components.

With specific reference to the embodiment associated with transceiver endsystems, FIGS. 8 and 9 show the redundant transmitter component system 10" as applied to an endsystem comprising the transceiver 41. Ultimately, the redundant transmitter component system 10" may be applied to communication network endsystems (not shown), especially for multiplexing and inverse multiplexing operations.

As shown in FIG. 8, the redundant transmitter component system 10" includes a plurality of transmitter components 12"–14". By cooperatively operating with one another, the plurality of transmitter components 12"–14" as a whole define the redundant component system 10" for the transceiver 41.

The transceiver 41 includes a terminal 55 for relaying data to and from the transceiver 41. Preferably, the terminal 55 includes a combiner 56 and a splitter 57, each for optically relaying data to and from the transceiver 41.

The transceiver 41 includes a plurality of laser transceiver 50. Each laser transceiver 50 is linked with the terminal 55. Each laser transceiver 50 includes a detector 51 and a respective transmitter component 12", 13", 14". Specifically, in operation, each transmitter component 12"–14" transmits data from each respective laser diode 50 to the terminal 55.

For one preferred embodiment, as illustratively shown in FIGS. 8 and 9, the first transmitter component 12" includes transmitter X, the second transmitter component 13" includes transmitter Y, and the third transmitter component 14" includes transmitter Z. Those of ordinary skill in the art will recognize that the redundant transmitter component system 10" for the transceiver 41 may include any number of transmitter components so long as there are at least two transmitter components that comprise the redundant transmitter component system 10". Moreover, instead of transceivers, those of ordinary skill in the art will recognize that the transceiver 51 may also include a redundant component system comprising a plurality of detectors 51.

With reference to FIG. 8, the first transmitter component 12", the second transmitter component 13", and the third transmitter component 14" are each powered by a power supply 23. As shown in FIG. 8, the transceiver 41 includes a switch 24, linked between the power supply 23 and the first transmitter component 12", the second transmitter component 13", and the third transmitter component 14". The switch 24 selectively engages each transmitter component 12"–14" with respect to the continuous endsystem functionality program sequence 100 of FIG. 9.

Similar to the redundant component system 10 of FIG. 1, the redundant transmitter component system 10" of FIG. 8 further includes the software component assembly 99. The software component assembly 99 stores and executes software components associated with the redundant component transmitter system 10" including the continuous endsystem functionality program sequence 100 and the code-based sequence 500. As shown in FIG. 8, in accordance with these software components, the software component assembly 99 is linked with the switch 24 and, ultimately, linked with the first transmitter component 12", the second transmitter component 13", and the third transmitter component 14" for selective engagement thereof. Preferably, the software component assembly 99 includes a memory device for storing software components and a processor for executing software components for operation thereof.

FIG. 9 illustrates the redundant transmitter component system 10" in operation providing functionality to the transceiver 41. In effect, the continuous endsystem functionality program sequence 100 of FIG. 9 as applied to a redundant transmitter component system 10" is identical to the continuous endsystem functionality program sequence 100 of FIG. 2 applied to a redundant component system 10. It should be further said that the continuous endsystem functionality program sequence 100 is, in a preferred embodiment, a software component for use by any device which operates with computer-based code, such as a computer, a wireless device, or an internet appliance for example. Preferably, the software component assembly 99 includes the continuous endsystem functionality program sequence 100 of FIG. 9.

Accordingly, referring to the continuous endsystem functionality program sequence 100 of FIG. 9, the transmitter X in step 110 is activated in preparation for operation thereof. In step 115, as indicated in FIG. 9 by a transmitter X functionality application arrow 12c, the transmitter X provides functionality to the transceiver 41.

In step 120, the transmitter Y is activated in preparation for operation. Based on the component overlap time value, T3, the transmitter X in step 125 is ending operation while the succeeding transmitter Y is beginning operation such that the transmitter X and the succeeding transmitter Y are both operational during this period. Therefore, the transmitter Y provides functionality to the transceiver 41 in step 130 and the transmitter X is deactivated in preparation for nonoperation in step 135. As indicated in FIG. 9 by a transmitter Y functionality application arrow 13c, the transmitter Y in step 130 provides functionality to the transceiver 41.

Similar to the initial operational correlation between the transmitter X and the transmitter Y in steps 110 through 135, the continuous endsystem functionality program sequence 100 of FIG. 9 continues with steps 130 through 170. For steps 130 through 170, those of ordinary skill in the art will recognize other time durations for the transceiver 41 so as to complete the operational time of the transceiver 41. Preferably, beginning with step 110, the duration of the continuous endsystem functionality program sequence 100 is dictated by the system operational time value, T2 of FIGS. 8–9.

Illustratively, the continuous endsystem functionality program sequence 100 of FIG. 9 is based on the redundant transmitter component system 10" of FIG. 8 having three components, transmitters X, Y, and Z. Therefore, the continuous endsystem functionality program sequence 100 of FIG. 9 ends by deactivating the transmitter Z with respect to the transmitter Y. However, so long as the duration of endsystem operation is dependent on the system operational time value, T2, those of ordinary skill in the art will readily recognize deactivating the continuous endsystem functionality program sequence 100 at any number of component 12"–14".

Referring now to step 140, the transmitter Z is activated in preparation for operation thereof. Based on the component overlap time value, T3, the transmitter Y in step 145 is ending operation while the succeeding transmitter Z is beginning operation such that the transmitter Y and the succeeding transmitter Z are both operational during this period. In step 150, as indicated in FIG. 9 by a transmitter Z functionality application arrow 14c, the transmitter Z provides functionality to the transceiver 41. The transmitter Y in step 155 is deactivated in preparation for nonoperation. In step 160, the transmitter X is activated in preparation for operation.

Preferably, the continuous endsystem functionality program sequence 100 ends by deactivating the transmitter Z. Thus, based on the component overlap time value, T3, the transmitter Z in step 165 is ending operation while the succeeding transmitter X is beginning operation such that the transmitter Z and the succeeding transmitter X are both operational during this period. The continuous endsystem functionality program sequence 100 of FIG. 9 ends in step 170 by deactivating the transmitter Z in preparation for nonoperation.

It must be said that the redundant transmitter component system 10" is configured for providing optimal functionality to the transceiver 41 based on a redundant component quantity, Tred. For purposes of illustration, the redundant component quantity for the embodiment of FIGS. 8 and 9 is the numeral three, although those of ordinary skill in the art will readily recognize other values for Tred as dependent from component system data. Generally, the redundant component quantity for the redundant transmitter component system 10" is provided by the code-based sequence 500 of FIG. 3 as is preferred. Like the continuous endsystem functionality program sequence 100 of FIG. 9, the software component assembly 99 provides the code based sequence 500 as applied to redundant transmitter component systems.

For purposes of illustration, consider the code-based sequence 500 as deriving the numeral three so as to configure the embodiment of FIGS. 8 and 9. Therefore, for illustrative purposes, the transceiver 41 must operate for 6.0 hours for T2, as associated with the system operational time value. For T1, as associated with the component time specification value, each transmitter component 12"–14" is limited to 1.5 hours of continuous operation. On the other hand, each transmitter component 12"–14" requires 5.0 hours to recover between operation for T4, as associated with the component recovery time value. The time required for interchanging between each successive transmitter component 12"–14" is 0.1 hours for T3, as associated with the component overlap time value. Moreover, in this example, the first constant, K1, is equal to the numeral two and the second constant, K2, is equal to the numeral one.

Referring to FIG. 3 with respect to the redundant transmitter component system 10", the code-based sequence 500 begins with the reception routine 605. In step 510, the component system data is read. In step 515, the software component for the code-based sequence 500 determines that T1, as associated with the component time specification value, is less than T2, as associated with the system operational time value. For a component time specification value less than the system operational time value, the code-based sequence 500 advances from step 515 to 520.

For the first quantity routine 615, the software component in step 520 solves the following program sequence with the component system data to produce the solved value, To:

$$\frac{T2}{(T1-(K1\times T3))} = \frac{6.0}{(1.5-(2.0\times 0.1))} = 4.61.$$

Thus, in step 525, the software component associates the solved value, To=4.61, with the operational component quantity. The operational component quantity is therefore 4.61.

For the second quantity routine 625, the software component in step 530 solves the following program sequence with the component system data to produce the solved value, Tr:

$$\frac{K2 + (T4/(T1-(K1\times T3)))}{\lfloor(T4/T2)\rfloor} = \frac{1.0 + (2.0/(1.5-(2.0\times 0.1)))}{\lfloor(2.0/6.0)\rfloor} = 2.53.$$

Therefore, in step 535, the software component associates the solved value, Tr=2.53, with the recovery component quantity. The recovery component quantity is therefore 2.53.

For the determination routine 635, the software component in step 540 compares the recovery component quantity, 2.53, with the operational component quantity, 4.61. Additionally, in step 540, the software component identifies the numeral 2.53 as the smallest numerical value between Tr and T-op. In step 545, because Tr and T-op are derived ratios, the software component converts the smallest identified numerical value, 2.53, to an integer value of 3.

Referring to step 550 of FIG. 3, the software component associates the integer value with the redundant component quantity. The redundant component quantity is therefore the integer value of 3. Given the derived redundant component quantity, the code-based sequence 500 of executes a configuration sequence 645. The configuration sequence 645 includes step 555 for configuring a redundant component system based on the redundant component quantity. Accordingly, the software component for the code-based sequence 500 in step 555 generates a design for a redundant transmitter component system having a total number of components equal to three transmitter components. In step 560, the software component for the code based sequence 500 provides output including a design of the component system of step 555 so that hardware associated with each disk component may be configured to form the redundant disk component system 10' of FIG. 6 for that design before ultimately ending the code-based sequence 500 in step 565.

To summarize each preferred embodiment of the present invention, one preferred embodiment includes the redundant component system 10 of FIG. 1 and the code-based system 500 for selecting the optimal number of components comprising the redundant component system 10. Through a continuous endsystem functionality program sequence 100 shown in FIG. 2, the redundant component system 10 provides continuous functionality to the endsystem 85 with fault tolerant characteristics, even during component failure or nonoperation.

For purposes of illustration, two other preferred embodiments are included in this disclosure for providing a redundant component system and a code-based sequence 500 as applied to a controller module endsystem and to a transceiver endsystem. Specifically, comparable to the preferred embodiment of FIG. 1, one embodiment provides the redundant disk component system 10' of FIGS. 5–7 and the code based system 500 for selecting the optimal number of disk components comprising the redundant disk component system 10'. Through a continuous endsystem functionality program sequence 100 shown in FIG. 7, the redundant disk component system 10' provides continuous functionality to the controller module 40, even during disk component failure or nonoperation. Moreover, comparable to the preferred embodiment of FIG. 1, one embodiment provides the redundant transmitter component system 10" of FIGS. 8–9 and the code based system 500 for selecting the optimal number of transmitter components comprising the redundant transmitter component system 10". Through a continuous endsystem functionality program sequence 100 shown in FIG. 9, the redundant transmitter component system 10" provides continuous functionality to the transceiver 41 with fault tolerant characteristics, even during disk component failure or nonoperation.

While the present invention has been disclosed in connection with the preferred embodiments thereof, it should be understood that there may be other embodiments which fall within the spirit and scope of the invention as defined by the following claims.

What is claimed is:

1. In a redundant component system, a method for facilitating endsystem functionality, comprising the steps of:

(a) receiving redundant component system data from a redundant component system including a component time specification value, a system operational time value, a component overlap time value, and a component recovery time value;

(b) for the component time specification value, the system operational time value, and the component overlap time value, producing a resulting operational component quantity;

(c) for the component time specification value, the system operational time value, the component overlap time value, and the component recovery time value, producing a resulting recovery component quantity; and (d) determining a redundant component quantity from the operational component quantity and the resulting recovery component quantity.

2. The method according to claim 1 wherein the step of producing a resulting operational component comprises the steps of:

(a) solving an operational program sequence $$\frac{T2}{(T1-(K1\times T3))}$$

for the a condition

T1<T2 to produce a solved value, T-op,
where
T1=the component time specification value,
T2=the system operational time value,
T3=the component time overlap value, and
K1=a first constant; and
(b) associating the solved value T-op with the operational component quantity.

3. The method according to claim 1 wherein the step of producing a resulting recovery component quantity comprises the steps of:
(a) solving a recovery program sequence $$\frac{K2+(T4/(T1-(K1\times T3)))}{\lfloor(T4/T2)\rfloor}$$

for a condition

T1<T2 to produce a solved value, Tr,
where
T1=the component time specification value,
T2=the system operational time value,
T3=the component time overlap value,
T4=the component recovery time value,
K1=a first constant, and
K2=a second constant; and
(b) associating the solved value Tr with the recovery component quantity.

4. The method according to claim 1 wherein the step of determining a redundant component quantity comprises the steps of:
(a) identifying the smallest numerical value between the operational component quantity, T-op, and the recovery component quantity, Tr;
(b) converting the identified smallest numerical value to an integer value, Tred; and
(c) associating the integer value, Tred, with the redundant component quantity.

5. The method according to claim 1 further comprising the step of configuring a redundant component system based on the redundant component quantity.

6. The method according to claim 5 wherein the step of configuring a redundant component system includes the step of generating a design for the component system.

7. The method according to claim 6 wherein the step of configuring a redundant component system comprises the step of providing an output of the design of the component system so that hardware associated with each component is configured to form the component system.

8. The method according to claim 1 further comprising the step of applying functionality to the endsystem via the redundant component system.

9. The method according to claim 1 wherein the step of applying functionality includes the step of providing continuous functionality to the endsystem via the redundant component system.

10. The method according to claim 1 wherein the redundant component system comprises a plurality of disk drives.

11. The method according to claim 1 wherein the redundant component quantity provides the minimum number of disk drives required for applying functionality to a controller module via the redundant component system.

12. The method according to claim 1 wherein the redundant component system comprises a plurality of transmitters.

13. The method according to claim 1 wherein the redundant component quantity provides the minimum number of transmitters required for applying functionality to a transceiver via the redundant component system.

14. The method according to claim 1 wherein the redundant component system comprises a plurality of detectors.

15. In a redundant component system wherein the redundant component system comprises a plurality of disk drives, a method for facilitating endsystem functionality, the method comprising the steps of:
a) receiving redundant component system data from a redundant component system including a component time specification value, a system operational time value, a component overlap time value, and a component recovery time value;
b) for the comoponent time specification value, the system operational time value, and the component overlap time value, producing a resulting operational component quantity;
c) for the component time specification value, the system operational time value, the component overlap time value, and the component recovery time value, producing a resulting recovery component quantity; and
d) determining a redundant component quantity from the operational component quantity and the resulting recovery component quantity.

16. The method according to claim 15 wherein the redundant component quantity provides the minimum number of said plurality of disk drives required for applying functionality to a controller module via the redundant component system.

17. In a redundant component system, a code-based sequence in a computer-readable medium for facilitating endsystem functionality, comprising:
(a) a reception routine for receiving redundant component system data from a redundant component system including a component time specification value, a system operational time value, a component overlap time value, and a component recovery time value;
(b) a first quantity routine for producing a resulting operational component quantity based on the component time specification value, the system operational time value, and the component overlap time value;
(c) a second quantity routine for producing a resulting recovery component quantity based on the component time specification value, the system operational time value, the component overlap time value, and the component recovery time value; and
(d) a determination routine determining a redundant component quantity from the operational component quantity and the resulting recovery component quantity.

18. The code-based sequence according to claim 17 further comprising a configuration sequence for configuring a redundant component system based on the redundant component quantity.

19. The code-based sequence according to claim 17 wherein the first quantity routine comprises:

a) a routine for solving an operational program sequence $$\frac{T2}{(T1-(K1\times T3))}$$

for a condition

T1<T2 to produce a solved value, T-op
where
T1=the component time specification value,
T2=the system operational time value,
T3=the component time overlap value,
K1=a first constant, and
b) a routine for associating the solved value T-op with the operational component quantity.

20. The code based sequence according to claim 17 wherein the second quantity routine comprises:
(a) a routine for solving a recovery program sequence $$\frac{K2+(T4/(T1-(K1\times T3)))}{\lfloor(T4/T2)\rfloor}$$

for a condition

T1<T2 to produce a solved value, Tr,
where
T1=the component time specification value,
T2=the system operational time value,
T3=the component time overlap value,
T4=the component recovery time value,
K1=a first constant, and
K2=a second constant; and
(b) a routine for associating the solved value Tr with the recovery component quantity.

21. The code based sequence according to claim 17 wherein the determination routine comprises:
(a) a routine for identifying the smallest numerical value between the operational component quantity, T-op, and the recovery component quantity, Tr;
(b) a routine for converting the identified smallest numerical value to an integer value, Tred; and
(c) a routine for associating the integer value, Tred, with the redundant component quantity.

22. The code based sequence according to claim 17 further comprising a routine for configuring a redundant component system based on the redundant component quantity.

23. The code based sequence according to claim 17 further comprising a routine for applying functionality to the endsystem via the redundant component system.

24. An arrangement, comprising:
(a) a redundant component system, the redundant component system including a plurality of components such that the total number of components of the plurality of components is based on a redundant component quantity;
(b) an endsystem linked with the redundant component system; and
(c) an arrangement for determining a redundant component quantity established by the steps of:
(a) identifying the smallest numerical value between a operational component quantity, T-op, and a recovery component quantity, Tr;

(b) converting the identified smallest numerical value to an integer value, Tred; and
(c) associating the integer value, Tred, with the redundant component quantity.

25. The arrangement according to claim 24 wherein the redundant component quantity is established through an operational program sequence.

26. The arrangement according to claim 25 wherein the operational program sequence comprises the steps of:
(a) solving an operational program sequence $$\frac{T2}{(T1-(K1\times T3))}$$

for a condition

T1<T2 to produce a solved value, T-op,
where
T1=the component time specification value,
T2=the system operational time value,
T3=the component time overlap value, and
K1=a first constant; and
(b) associating the solved value T-op with the operational component quantity.

27. The arrangement according to claim 24 wherein the redundant component quantity is established through a recovery program sequence.

28. The arrangement according to claim 27 wherein the recovery program sequence quantity comprises the steps of:
(a) solving a recovery program sequence $$\frac{K2+(T4/(T1-(K1\times T3)))}{\lfloor(T4/T2)\rfloor}$$

for a condition

T1<T2 to produce a solved value, Tr,
where
T1=the component time specification value,
T2=the system operational time value,
T3=the component time overlap value,
T4=the component recovery time value,
K1=a first constant, and
K2=a second constant; and
(b) associating the solved value Tr with the recovery component quantity.

29. The arrangement according to claim 24 wherein the redundant component system applies functionality to the endsystem.

30. An arrangement, comprising:
(a) a redundant component system, the redundant component system including a plurality of components such that the total number of components of the plurality of components is based on a redundant component quantity; and
(b) an endsystem linked with the redundant component system wherein the redundant component quantity is established through an operational program sequence and wherein the operational program sequence comprises the steps of:

(1) solving an operational program sequence $$\frac{T2}{(T1-(K1\times T3))}$$

for a condition $T1<T2$ to produce a solved value, T-op,
 where
  T1=the component time specification value,
  T2=the system operational time value,
  T3=the component time overlap value, and
  K1=a first constant; and
(2) associating the solved value T-op with the operational component quantity.

31. An arrangement, comprising:
(a) a redundant component system, the redundant component system including a plurality of components such that the total number of components of the plurality of components is based on a redundant component quantity; and
(b) an endsystem linked with the redundant component system, wherein the redundant component quantity is established through a recovery program sequence and wherein the recovery program sequence quantity comprises the steps of:
(1) solving a recovery program sequence $$\frac{K2+(T4/(T1-(K1\times T3)))}{\lfloor(T4/T2)\rfloor}$$

for a condition $T1<T2$ to produce a solved value, Tr,
 where
  T1=the component time specification value,
  T2=the system operational time value,
  T3=the component time overlap value,
  T4=the component recovery time value,
  K1=a first constant, and
  K2=a second constant; and
(2) associating the solved value Tr with the recovery component quantity.

* * * * *

UNITED STATES PATENT AND TRADEMARK OFFICE
CERTIFICATE OF CORRECTION

PATENT NO. : 6,862,691 B2  Page 1 of 1
APPLICATION NO. : 09/957268
DATED : March 1, 2005
INVENTOR(S) : Douglas Todd Hayden It is certified that error appears in the above-identified patent and that said Letters Patent is hereby corrected as shown below:

IN THE CLAIMS

Claim 2, Column 17, line 6, after "for" delete "the"

Signed and Sealed this

Twenty-seventh Day of May, 2008

JON W. DUDAS
*Director of the United States Patent and Trademark Office*